United States Patent
Kobayashi (10) Patent No.: US 10,461,308 B2
(45) Date of Patent: Oct. 29, 2019

(54) SEALED BATTERY AND METHOD OF MANUFACTURE

(71) Applicant: TOYOTA JIDOSHA KABUSHIKI KAISHA, Toyota-shi, Aichi (JP)

(72) Inventor: Keiichiro Kobayashi, Toyota (JP)

(73) Assignee: TOYOTA JIDOSHA KABUSHIKI KAISHA, Toyota-shi, Aichi (JP)

(*) Notice: Subject to any disclaimer, the term of this patent is extended or adjusted under 35 U.S.C. 154(b) by 0 days.

(21) Appl. No.: 14/959,348

(22) Filed: Dec. 4, 2015

(65) Prior Publication Data

US 2016/0164067 A1   Jun. 9, 2016

(30) Foreign Application Priority Data

Dec. 5, 2014  (JP) .................. 2014-247176

(51) Int. Cl.
| | |
|---|---|
| *H01M 2/08* | (2006.01) |
| *H01M 2/36* | (2006.01) |
| *H01M 4/82* | (2006.01) |
| *H01M 6/00* | (2006.01) |
| *H01M 2/04* | (2006.01) |
| *H01M 10/34* | (2006.01) |

(52) U.S. Cl.
CPC ............ *H01M 2/365* (2013.01); *H01M 2/04* (2013.01); *H01M 2/36* (2013.01); *H01M 2/362* (2013.01); *H01M 10/34* (2013.01); *H01M 2220/20* (2013.01); *Y02E 60/13* (2013.01)

(58) Field of Classification Search
CPC ............. H01M 2/08; H01M 2/36; H01M 2/04
See application file for complete search history.

(56) References Cited

U.S. PATENT DOCUMENTS

| | | | |
|---|---|---|---|
| 2005/0029985 A1 | 2/2005 | Hano et al. | |
| 2005/0164079 A1* | 7/2005 | Kim ............ | H01M 2/365 |
| | | | 429/174 |
| 2011/0183196 A1 | 7/2011 | Suzuki et al. | |
| 2012/0214053 A1 | 8/2012 | Kim | |
| 2013/0224564 A1 | 8/2013 | Kim | |
| 2014/0295259 A1 | 10/2014 | Nakayama et al. | |

FOREIGN PATENT DOCUMENTS

| | | |
|---|---|---|
| CN | 101083310 A | 12/2007 |
| JP | 2000-106156 A | 4/2000 |
| JP | 2000106155 A | 4/2000 |
| JP | 2003-208923 A | 7/2003 |
| JP | 2007-323860 A | 12/2007 |
| JP | 2011-86382 A | 4/2011 |
| JP | 2012-174684 A | 9/2012 |
| JP | 2013-175432 A | 9/2013 |

* cited by examiner

*Primary Examiner* — Cynthia H Kelly
*Assistant Examiner* — Julian Anthony
(74) *Attorney, Agent, or Firm* — Sughrue Mion, PLLC (57) ABSTRACT

A sealed battery according to the disclosure includes: a case provided with a case body having an opening therein and a lid that is sized so as to be capable of closing the opening and that has an electrolyte fill port; an electrode assembly that is housed in the case; and an electrolyte solution. The lid is provided with a filler plug that is welded to the lid so as to close the fill port. The lid has an outside surface with a region thereon subjected to electrolyte-repelling treatment so as to surround the weld where the filler plug is welded.

9 Claims, 4 Drawing Sheets

SEALED BATTERY AND METHOD OF MANUFACTURE

CROSS-REFERENCE TO RELATED APPLICATIONS

This application claims priority from Japanese Patent Application No. 2014-247176, filed on Dec. 5, 2014, the disclosure of which is incorporated herein by reference in its entirety.

FIELD

The embodiments described below relate to a sealed battery and to a method of manufacturing the same.

DESCRIPTION OF THE RELATED ART

In recent years, lithium ion secondary batteries, nickel-hydrogen batteries and other types of sealed secondary batteries have grown in importance as on-board power sources for vehicles and as power sources for personal computers and handheld devices. One type of sealed battery in particular—the lithium ion secondary battery, which is lightweight and capable of achieving a high energy density, is favored for use as a high-output power source for on-board use in vehicles.

Sealed batteries have the construction described in, for example, Japanese Patent Application Laid-open No. 2012-174684. That is, the sealed battery is provided with an electrode assembly, a case body which houses the electrode assembly and has an opening therein, a lid which closes the opening, and current-collecting terminals, one end of which is connected to the electrode assembly at the interior of the case body and another end of which passes through and protrudes outside of the lid. An electrolyte solution is enclosed in the interior of the case. A fill port is provided in the lid for filling the electrolyte solution into the case interior at the time of sealed battery production. The fill port is closed with a filler plug.

The method used for closing the fill port with a filler plug generally involves, as described in, for example, Japanese Patent Application Laid-open No. 2003-208923, welding together the lid and the filler plug in the vicinity of the fill port.

SUMMARY

After the electrolyte solution has been filled into the case interior, as noted above, welding of the lid with the filler plug is carried out. However, sometimes electrolyte solution adheres to a region near the fill port on the lid where the welding is to be carried out. When welding is carried out with electrolyte solution adhering to this region, defects in the welding sometimes arise. Defects in the welding may include the formation of a sink (i.e., a depression that forms on the surface of the lid near the fill port) or a void (i.e., a cavity that forms at the interior of the region where welding is carried out). Hence, there is a need to carry out the step of removing electrolyte solution remaining on the lid (e.g., the step of wiping off electrolyte solution remaining on the lid with nonwoven fabric or the like). However, even with this step, the electrolyte solution sometimes cannot be completely removed, and so welding defects may nevertheless arise.

Accordingly, an object of this disclosure is to provide a sealed battery which enables electrolyte solution remaining near the fill port to be more reliably removed at the time of manufacture. Another object of an embodiment of this disclosure is to provide a method of manufacturing such a sealed battery.

An exemplary embodiment of the sealed battery disclosed herein includes a case that is provided with: a case body having an opening therein, and a lid that is sized so as to be capable of closing the opening and that has an electrolyte fill port. The sealed battery further includes an electrode assembly that is housed in the case and an electrolyte solution.

The lid is provided with a filler plug that is welded to the lid in such a way as to close the fill port. An outside surface of the lid has thereon a region subjected to electrolyte-repelling treatment in such a way as to surround the weld where the filler plug is welded. Such a construction is obtained by carrying out welding where electrolyte-repelling treatment has been applied to a region that includes the region to be welded on the outside surface of the lid.

Here, "electrolyte-repelling treatment" refers to treatment of the lid surface which, compared with prior to the application of such electrolyte-repelling treatment, imparts (or enhances) the ability of the treated lid surface to repel the electrolyte solution. Hence, "a region subjected to electrolyte-repelling treatment" is a given region on the outside-facing surface of the lid that includes the region (surface) to be welded and refers here to a region on the outside surface of the lid where, compared with prior to the application of such electrolyte-repelling treatment, the ability to repel the electrolyte solution has been imparted (or enhanced).

Accordingly, an embodiment of this disclosure provides the advantage that, when electrolyte solution is filled into the case interior during the manufacture of a sealed battery, even if dripping of the electrolyte solution occurs near the fill port, the electrolyte solution does not accumulate within the region that has been subjected to electrolyte-repelling treatment and is easily driven away. Therefore, electrolyte solution does not easily remain in the region of the outside surface of the lid where welding is to be carried out, basically eliminating the need to carry out the removal of electrolyte solution remaining near the fill port. Even if electrolyte solution were to remain, because the electrolyte solution is on a surface that has been subjected to electrolyte-repelling treatment, removal is easy. As a result, the removal of electrolyte solution remaining near the fill port during manufacture can be more reliably carried out. Accordingly, in the sealed battery disclosed herein, a high sealability owing to reliable welding of the electrolyte fill port is achieved.

In a preferred embodiment of the sealed battery disclosed herein, the outside surface of the lid additionally has, near the region on the lid surface subjected to electrolyte-repelling treatment, a region that has been subjected to electrolyte affinity-imparting treatment.

Here, "electrolyte affinity-imparting treatment" refers to treatment of the lid surface which, compared with prior to the application of such electrolyte affinity-imparting treatment, imparts (or enhances) the affinity of the treated lid surface to the electrolyte solution (i.e., the ease of electrolyte solution adhesion, also referred to simply as the wettability). Therefore, "a region subjected to electrolyte affinity-imparting treatment" is a given region on the surface of the lid where, compared with prior to the application of such electrolyte affinity-imparting treatment, affinity to the electrolyte solution (wettability) has been imparted (or enhanced).

Such an arrangement enables electrolyte solution that has been driven away from a region subjected to electrolyte-repelling treatment to be captured in a region subjected to electrolyte affinity-imparting treatment (high affinity surface), which more reliably prevents infiltration of the electrolyte solution into the region on the outside surface of the lid where welding is to be carried out and makes it possible to provide a sealed battery in which a filler plug has been reliably welded to the periphery of the electrolyte fill port and a high sealability has been achieved.

In another preferred embodiment of the sealed battery disclosed herein, the fill port in the lid has, on a peripheral wall thereof, a retainer for setting thereon the filler plug, and a surface on which the filler plug is set in the retainer has been subjected to the electrolyte-repelling treatment.

With this arrangement, electrolyte solution is easily removed from the retainer for setting thereon the filler plug, making it possible to provide a sealed battery in which the filler plug has been reliably welded to the periphery of the electrolyte fill port and a high sealability has been achieved.

In yet another preferred embodiment of the sealed battery disclosed herein, the fill port in the lid has, on a peripheral wall thereof, a step (recess) capable of retaining the electrolyte solution at least temporarily, and in the step (recess) a surface facing the filler plug has been subjected to electrolyte affinity-imparting treatment.

With this arrangement, electrolyte solution present on the periphery of the fill port in the lid at the region where the filler plug is to be welded can be easily led to the step that has been subjected to electrolyte affinity-imparting treatment. As a result, the electrolyte solution is easily discharged from the region to be welded, making it possible to provide a sealed battery in which the filler plug has been reliably welded to the periphery of the electrolyte fill port and a high sealability has been achieved.

In another aspect, an embodiment of this disclosure provides a method of manufacturing the sealed battery disclosed herein.

More specifically, the method of manufacturing the sealed battery disclosed herein is a method of manufacturing a sealed battery that includes a case provided with a case body having an opening therein and a lid that is sized so as to be capable of closing the opening and that has an electrolyte fill port, an electrode assembly that is housed in the case, and an electrolyte solution. This method includes: using the electrode assembly, the case body and the lid to assemble a cell assembly (i.e., the battery prior to initial charging) in which the electrode assembly is housed at an interior of the case, with the lid that has been subjected to electrolyte-repelling treatment being used in a region peripheral to the fill port on the lid where welding is to be carried out; filling an electrolyte solution through the fill port into the case; and closing the fill port by welding together the lid and the filler plug. In this manufacturing method, electrolyte-repelling treatment is carried out in a region that includes the region of the outside surface of the lid where welding is to be carried out. Therefore, even if electrolyte solution drips down near the fill port during the filling of electrolyte solution into the case interior, the electrolyte solution is driven away from the region that has been subjected to electrolyte-repelling treatment. As a result, the electrolyte solution does not easily remain in the region where the outside surface of the lid is to be welded, basically eliminating the need to carry out the removal of electrolyte solution remaining near the fill port. Even if electrolyte solution were to remain, because the electrolyte solution is on a surface that has been subjected to electrolyte-repelling treatment, removal is easy. As a result, the removal of electrolyte solution remaining near the fill port during manufacture can be more reliably carried out, making it possible to manufacture a sealed battery in which the filler plug has been reliably welded to the periphery of the electrolyte fill port and a high sealability has been achieved.

In a preferred embodiment of the method of manufacturing the sealed battery disclosed herein, the outside surface of the lid that is used has, near the region on the lid surface subjected to electrolyte-repelling treatment, a region subjected to electrolyte affinity-imparting treatment.

In another preferred embodiment, the fill port in the lid that is used has, on a peripheral wall thereof, a retainer for setting thereon the filler plug, and a surface on which the filler plug is set in the retainer has been subjected to the electrolyte-repelling treatment.

In yet another preferred embodiment, the fill port in the lid that is used has, on a peripheral wall thereof, a step (recess) capable of retaining the electrolyte solution at least temporarily, and in the step (recess) a surface facing the filler plug has been subjected to electrolyte affinity-imparting treatment.

By using a lid having any of these constructions, the infiltration or presence of electrolyte solution in the region of the lid outside surface where welding is to be carried out can be reliably prevented, thereby enabling the more preferable manufacture of a sealed battery in which the filler plug has been reliably welded to the periphery of the electrolyte fill port and a high sealability has been achieved.

DESCRIPTION OF THE PREFERRED EMBODIMENTS

Preferred embodiments of the disclosure are described below while referring to the figures. In the following description, members or features having like functions are designated by like symbols, and repeated explanations may be omitted or simplified. Relative dimensions (such as length, width and depth) of features shown in the diagrams may not be true to scale. Matters which are not specifically mentioned in the disclosure but which are necessary for working with the embodiments disclosed will be understood by persons of ordinary skill in the art as matters of design which are based on prior art in the field.

A lithium ion secondary battery provided with a nonaqueous electrolyte solution is described as a preferred embodiment of the sealed battery disclosed herein, although this disclosure is not intended to be limited to such batteries. In this disclosure, "battery" is a term referring generally to an electrical storage device from which electrical energy can be extracted, and is a concept that includes both primary batteries and secondary batteries. "Secondary battery" refers generally to an electrical storage device that can be repeatedly charged and discharged, and includes not only so-called storage batteries (i.e., chemical batteries) such as lithium ion secondary batteries, lithium metal secondary batteries, sodium ion secondary batteries, nickel-hydrogen batteries and nickel cadmium batteries, but also capacitors (i.e., physical batteries) such as electrical double-layer capacitors. The art disclosed herein preferably applies to, typically, sealed lithium ion secondary batteries.

Figure 1:
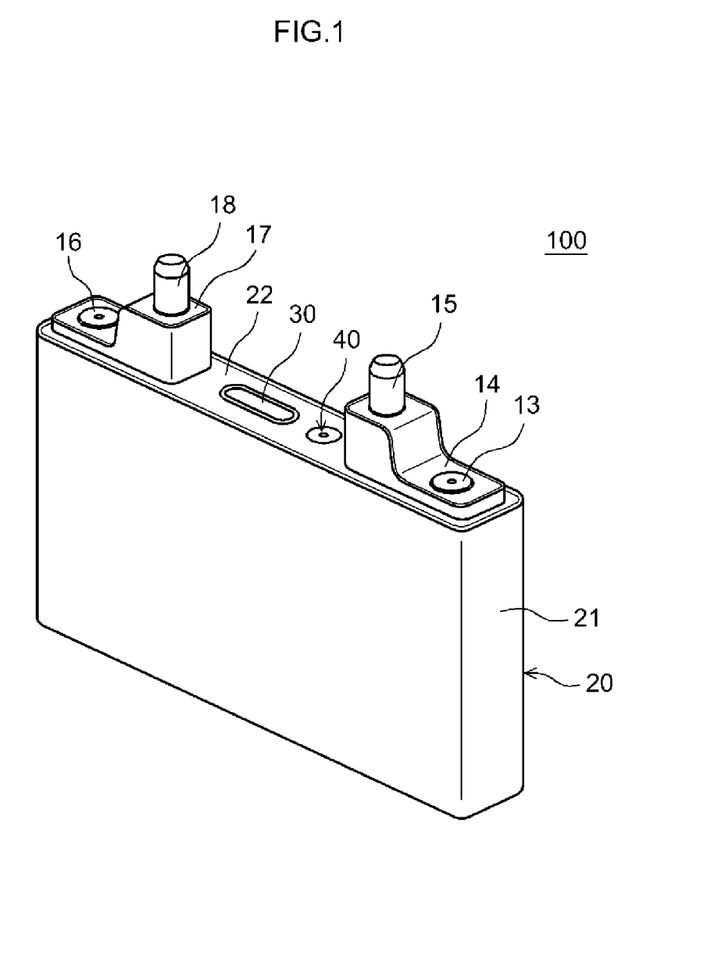
FIG. 1 is a perspective view showing an external shape of a sealed battery according to an exemplary embodiment of the disclosure.
Figure 2:
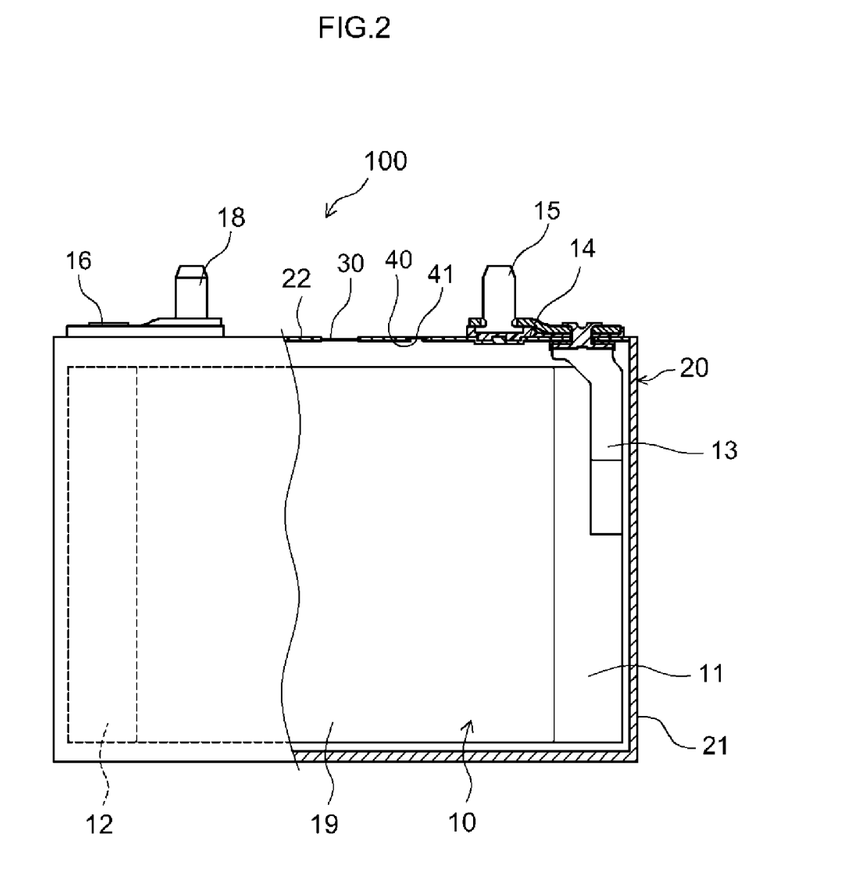
FIG. 2 is a sectional, partially cutaway, view of a sealed battery according to the same embodiment.

FIG. 1 is a perspective view schematically showing the external shape of a lithium ion secondary battery 100 according to one embodiment of the disclosure, and FIG. 2 is a sectional, partially cutaway, view of the lithium ion secondary battery 100.

Referring to FIGS. 1 and 2, the lithium ion secondary battery 100 according to this embodiment typically has a construction in which an electrode assembly 10, that includes given battery members (a positive electrode, a negative electrode, a separator, etc.), is housed together with a suitable nonaqueous electrolyte (not shown) in a case 20.

The lithium ion secondary battery 100 according to this embodiment is a so-called prismatic battery in which a wound electrode assembly 10 with a flattened shape is constructed by placing a positive electrode 11, a negative electrode 12 and two separators 19, each shaped as elongated sheets, over one another and winding them together in a lengthwise direction. The wound electrode assembly is housed in a case 20 having a corresponding box-like (rectangular) shape. However, the battery is not limited to a prismatic shape, and may instead have, for example, a cylindrical shape.

The case 20 is composed of a box-shaped case body 21 having an opening at one end (that is, it has a rectangular cylindrical shape that is open at one end). The end having the opening may correspond to a top end in the normal state of use of the battery 100 according to this embodiment, and a lid 22 (a structural component of the case) made of a rectangular plate member is attached to and closes the opening. The lid 22 is welded to a rim of the opening in the case body 21, thereby constructing a prismatic case 20 of hexahedral shape. The hexahedral shape of the prismatic case 20 corresponds to the wound electrode assembly 10 having a flattened shape.

The material making up the case 20 may be the same that is used in conventional sealed batteries, and is not particularly limiting. A case 20 constructed primarily of a metallic material that is lightweight and has a good thermal conductivity is preferred. Illustrative examples of such metallic materials include aluminum, stainless steel and nickel-plated steel. The case 20 (i.e., the case body 21 and the lid 22) according to this embodiment is constructed of aluminum or an alloy made primarily of aluminum.

The lid (which constitutes a rectangular face of the case) 22 has fixed thereto a positive electrode current-collecting terminal 13 and a negative electrode current-collecting terminal 16 for external connection. One end (an end inside the case 20) of each of these current-collecting terminals 13, 16 is electrically connected to, respectively, the positive electrode 11 and the negative electrode 12 of the electrode assembly 10. Another end (an end outside case 20) of each of these current-collecting terminals 13, 16 passes through and protrudes outside of the lid 22, and the top of the terminal thereof is caulked (swaged). The current-collecting terminals 13 and 16 are electrically connected to external connecting terminals 14, 17 via fastening members 15, 18.

The positive electrode 11 and negative electrode 12 of the lithium ion secondary battery 100 each contain an electrode active material that can reversibly intercalate and deintercalate lithium. That is, the negative electrode 12 has a negative electrode active material-containing negative electrode active material layer formed at the surface of a metal current collector made of copper foil or the like. For example, a carbon material such as graphite, hard carbon or soft carbon may be used as the negative electrode active material. Of these, preferred use can be made of amorphous graphite (a material in a form obtained by coating amorphous carbon onto the surface of graphite particles). Preferred use can be made of a negative electrode in a form obtained by depositing the carbon material, together with a binder and other ingredients such as a conductive material which are used as needed, as a negative electrode active material layer on the negative electrode current collector. Illustrative examples of the binder include polyvinylidene fluoride (PVDF), polytetrafluoroethylene (PTFE), carboxymethyl cellulose (CMC) and styrene-butadiene rubber (SBR).

The positive electrode 11 has a positive electrode active material containing a positive electrode active material layer formed on the surface of a metal current collector made of aluminum foil or the like. For example, preferred use can be made of a positive electrode in a form obtained by depositing a suitable positive electrode active material, together with a binder, a conductive material and the like, as a positive electrode active material layer on a positive electrode current collector. Preferred use as the positive electrode active material can be made of, for example, oxide-based active materials having a layered structure and oxide-based active materials having a spinel structure that are used in the positive electrodes of conventional lithium ion secondary batteries. Illustrative examples of such active materials include lithium-transition metal oxides such as lithium cobalt-based oxides, lithium nickel-based oxides and lithium-manganese-based oxides. Illustrative examples of the conductive material include carbon materials such as carbon black (e.g., acetylene black) and graphite powder, and electrically conductive metal powders such as nickel powder. The binder used may be, for example, the same as the binder used in the negative electrode.

Because the makeup and properties of the positive electrode active material layer and the negative electrode active material layer do not in any way limit the practice of this embodiment, more detailed explanations concerning these are omitted in this disclosure.

In the wound electrode assembly 10 according to this embodiment, the positive electrode 11 and the negative electrode 12 are typically insulated from each other by interposing a separator 19 therebetween. The separator 19 used may be similar to the separators used in conventional lithium ion secondary batteries, and is not particularly limited. For example, use can be made of a porous sheet, nonwoven fabric or the like made of a resin such as polyethylene (PE), polypropylene (PP), polyester, cellulose or polyamide.

Preferred use can be made of a nonaqueous electrolyte solution containing a nonaqueous solvent and a lithium salt (supporting electrolyte) that is soluble in the solvent as the electrolyte solution situated between the positive electrode 11 and the negative electrode 12. Exemplary nonaqueous solvents include aprotic solvents such as carbonates, esters, ethers, nitriles, sulfones and lactones. For example, use may be made of one, two or more selected from among nonaqueous solvents that are known to be generally capable of being used in the electrolyte solutions of lithium ion batteries, such as ethylene carbonate (EC), propylene carbonate (PC), diethyl carbonate (DEC), dimethyl carbonate (DMC), ethyl methyl carbonate (EMC), 1,2-dimethoxyethane, 1,2-diethoxyethane, tetrahydrofuran, 2-methyltetrahydrofuran, dioxane, 1,3-dioxolane, diethylene glycol dimethyl ether, ethylene glycol dimethyl ether, acetonitrile, propionitrile, nitromethane, N,N-dimethylformamide, dimethylsulfoxide, sulfolane and γ-butyrolactone.

The supporting electrolyte may be, for example, one, two or more selected from among various lithium salts known to be capable of functioning as supporting electrolytes in electrolyte solutions for lithium ion batteries, such as $LiPF_6$, $LiBF_4$, $LiN(SO_2CF_3)_2$, $LiN(SO_2C_2F_5)_2$, $LiCF_3SO_3$, $LiC_4F_9SO_3$, $LiC(SO_2CF_3)_3$ and $LiClO_4$. The concentration of the supporting electrolyte (supporting salt) is not particularly limited, and, for example, may be similar to that of electrolyte solutions used in conventional lithium ion secondary batteries. Typically, a nonaqueous electrolyte solution containing the supporting electrolyte in a concentration from about 0.1 mol/L to about 5 mol/L (e.g., from about 0.8 mol/L to about 1.5 mol/L) can be advantageously used.

Formed at the center in the width direction of the lid (a rectangular face of case) 22a, and positioned between the current-collecting terminals 13, 16, is a thin-walled safety valve 30 constructed so as to release the internal pressure within the case 20 when such pressure rises to or above a predetermined level (e.g., a set valve-opening pressure of from about 0.3 MPa to about 1.0 MPa) and an electrolyte fill port 40. The fill port 40 is capped with a filler plug 41 so as to close the fill port 40 and is fixed in place by welding, thereby hermetically sealing the fill port 40.

Figure 3:
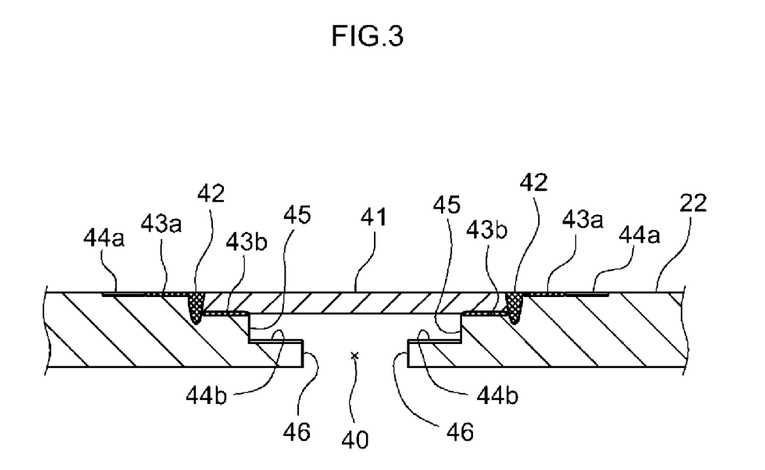
FIG. 3 is a cross-sectional view of the electrolyte fill port and the periphery thereof in a sealed battery according to the same embodiment.
Figure 4:
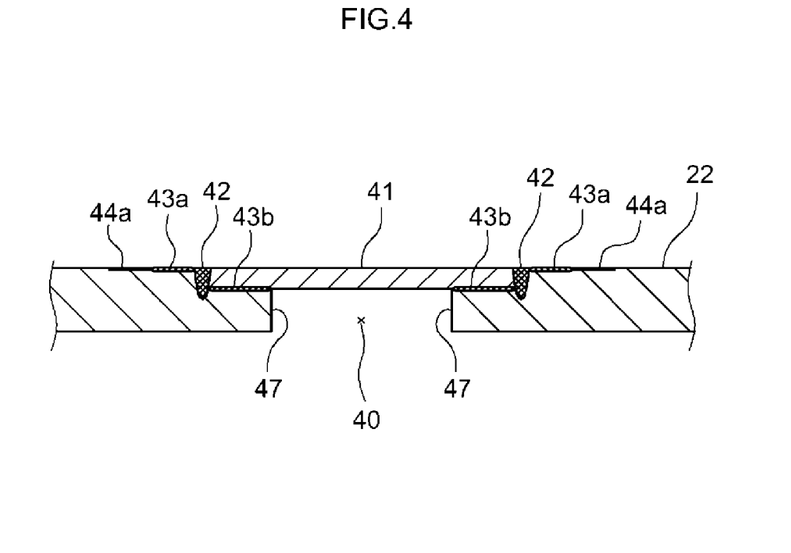
FIG. 4 is a cross-sectional view of the electrolyte fill port and the periphery thereof in a sealed battery according to another embodiment of the disclosure.

Next, the structure in the vicinity of the electrolyte fill port 40 in this embodiment is described in detail while referring to the FIGS. 3 and 4. FIG. 3 is a cross-sectional view of the electrolyte fill port 40 on the lid 22 and the periphery thereof. Referring to FIG. 3, two steps 45, 46 are provided on a peripheral wall of the electrolyte fill port 40 in the lid 22. In this embodiment, of the two steps 45, 46, a first step 45 nearer to the outside surface (top) of the lid 22 corresponds to a retainer 45 on which the filler plug 41 is to be set. That is, in this embodiment, the filler plug 41 is received in, of the two steps provided at the interior of the electrolyte fill port 40, a recess formed by the top step (retainer) 45 and set on the surface of this top step (retainer) 45. In this state, the peripheral edge of the filler plug 41 is welded to the lid 22.

The periphery of the weld 42 where the filler plug 41 is welded has been subjected to electrolyte-repelling treatment. For example, a region 43a where the outside surface (i.e., the top face) of the lid 22 was subjected to electrolyte-repelling treatment circumscribes the outside of the weld 42 (or outer portion of weld 42), and a region 43b where the level surface of the retainer 45 on which the filler plug is set was subjected to electrolyte-repelling treatment inscribes the inside of the weld 42. Region 43a may also abut or overlap an outer portion of weld 42. This structure is obtained by carrying out a given welding operation (e.g., laser welding) on the region 42 to be welded on the outside surface (top face) of the lid 22 where the regions 42, 43a and 43b that are subjected beforehand to electrolyte-repelling treatment have been formed. Hence, even if, during manufacture of the lithium ion secondary battery 100, the nonaqueous electrolyte solution drips down in the vicinity of the electrolyte fill port 40 during filling of the nonaqueous electrolyte solution into the case 20 interior, this nonaqueous electrolyte solution is easily driven away from the regions 43a, 43b because they have been subjected to electrolyte-repelling treatment. Therefore, the nonaqueous electrolyte solution does not easily remain in the region on the outside surface of the lid 22 where such welding is to be carried out (the periphery of the electrolyte fill port 40), and so there is basically no need to carry out the removal of electrolyte solution remaining in the vicinity of the electrolyte fill port 40. Even if nonaqueous electrolyte solution were to remain, because such remaining nonaqueous electrolyte solution is on a surface that has been subjected to electrolyte-repelling treatment, removal of the solution is easy. As a result, the removal of electrolyte solution remaining in the vicinity of the fill port 40 can be more reliably carried out during manufacture.

The electrolyte-repelling treatment should be carried out by a method that has been suitably selected from among known methods according to the type of electrolyte solution used and the material making up the lid 22, although no particular limitation is imposed on the specifics of such treatment. This treatment is exemplified by chemical treatment in which an electrolyte solution-repelling film is coated onto some regions (43a, 43b) of the surface of the lid 22 or other surface by ordinary fluoroplastic coating or some other vapor deposition process, and physical treatment in which the electrolyte solution-repelling properties are enhanced at some regions (43a, 43b) of the surface of the lid 22 or other surface by carrying out surface etching such as sputter etching. Combinations of such chemical treatment and physical treatment are also possible. Electrolyte-repelling treatment is preferably carried out in such a way that the electrolyte solution used has a contact angle with the surface of the lid 22 that is greater than 90° (preferably 100° or more, and even more preferably 120° or more).

As shown in FIG. 3, the lithium ion secondary battery 100 according to this embodiment also has, in the vicinity of the regions 43a, 43b on the surface of the lid 22 that have been subjected to electrolyte-repelling treatment, regions that are subjected to electrolyte affinity-imparting treatment. That is, near the outside of the region 43a that has been subjected to electrolyte-repelling treatment on the outer peripheral side of the weld 42 on the outside surface of the lid 22, there exists a region 44a that has been subjected to electrolyte affinity-imparting treatment. As shown in FIG. 3, region 44a may be adjacent to region 43a on a top surface of lid 22. In addition, on the top surface of a second step 46 that, of the two steps (recesses) 45, 46, is closer to the inside surface (bottom side) of the lid 22 (that is, on a flat plane facing the filler plug 41 that has been set on the retainer 45), there exists a region 44b that has been subjected to electrolyte affinity-imparting treatment. The advantage of such an arrangement is that the nonaqueous electrolyte solution which has been driven away from the regions 43a, 43b subjected to electrolyte-repelling treatment can be captured (held) in the regions 44a, 44b subjected to electrolyte affinity-imparting treatment, making it possible to prevent the nonaqueous electrolyte solution from infiltrating into the region 42 on the outside surface of the lid 22 where welding is to be carried out.

The electrolyte affinity-imparting treatment should be carried out by a method that has been suitably selected from among known methods according to the type of electrolyte solution used and the material making up the lid 22, although no particular limitation is imposed on the specifics of such treatment. For example, the electrolyte affinity of some regions (44a, 44b) of the lid 22 can be increased by using a technique such as hydrothermal treatment, ultraviolet irradiation or plasma irradiation to carry out surface treatment on the lid 22 or other surface. Electrolyte affinity-imparting treatment is preferably carried out in such a way that the electrolyte solution used has a contact angle with the surface of the lid 22 that is less than 90° (preferably 80° or less, more preferably 60° or less, and even more preferably 40° or less).

The structure of the electrolyte fill port 40 and the periphery thereof on the lid 22 according to this embodiment have been described above, but this embodiment is not limited to this particular form. For example, the foregoing embodiment may have, in one variation thereof, the structure shown in FIG. 4. In this variation, only one step (recess) 47 is provided at the interior of the electrolyte fill port 40, and this serves as a retainer 47 similar to that in the above embodiment. That is, in this variation, the filler plug 41 is received in a recess formed by the retainer 47 provided at the interior of the electrolyte fill port 40 and is set on the surface of the retainer 47. The peripheral edge of the filler plug 41 is, in this state, welded to the lid 22. In this variation, a region 43a where the top face of the lid 22 has been subjected to electrolyte-repelling treatment circumscribes the outside of the weld 42, and a region 43b where the top face of the retainer 47 has been subjected to electrolyte-repelling treatment inscribes the inside of the weld 42. Region 43a may also abut or overlap an outer portion of weld 42. In addition, adjacent to the outside of the region 43a that has been subjected to electrolyte-repelling treatment on the outer peripheral side of the weld 42, there exists a region 44a that has been subjected to electrolyte affinity-imparting treatment. This arrangement also provides advantageous effects similar to those described above.

Next, a method of manufacturing the lithium ion secondary battery 100 according to this embodiment is described. Manufacture of the lithium ion secondary battery 100 according to this embodiment generally entails carrying out the step of, using a prefabricated electrode assembly (in this case, the wound electrode assembly described above) 10, a case body 21 that houses the electrode assembly 10 and has an opening, a lid 22 which is sized so as to be capable of closing the opening and which has an electrolyte fill port 40 therein, and current-collecting terminals 13, 16, assembling a cell assembly (that is, the battery 100 before initial charging). The battery 100 has the electrode assembly 10 in its interior and one end of each of the current-collecting terminals 13, 16 is connected to the electrode assembly 10 and the other end passes through and protrudes outside of the lid 22.

Specifically, first the outside ends of the positive and negative current-collecting terminals 13, 16 are made to protrude outward from the lid 22, and the terminals 13, 16 are fixed to the lid 22. The inside ends of the terminals 13, 16 are connected (e.g., welded) to the positive electrode 11 and the negative electrode 12 of the wound electrode assembly 10, thereby joining together the lid 22 and the electrode assembly 10. The electrode assembly 10 to which the lid 22 has been joined is received through the opening in the case body 21 and into the interior thereof, and the lid 22 is made to cover the opening, following which the joint between the lid 22 and the case body 21 is sealed by welding that involves irradiation with an electron beam or laser, for example, (typically, laser welding). If necessary, external connecting terminals 14, 17 and fastening members 15, 18 are attached by rotary swaging (rotary caulking) the tops of the current-collecting terminals 13, 16.

The lid 22 used in assembling the cell assembly is one in which the step of carrying out electrolyte-repelling treatment as described above has been carried out beforehand in a region that includes the region where welding is to be carried out around the electrolyte fill port 40, thereby forming regions 42, 43a and 43b that have been subjected to electrolyte-repelling treatment. The use of a lid 22 having also regions 44a, 44b that have been subjected to electrolyte affinity-imparting treatment as described above may also be used.

Next, the step of filling electrolyte into the interior of the case 20 through the electrolyte fill port 40 is carried out. This step may be carried out by a known method. For example, it may be carried out by bringing the fill nozzle of a given electrolyte filling device (not shown) into close contact with the electrolyte fill port 40 and carrying out filling under reduced pressure.

Here, when the fill nozzle is separated from the fill port 40 after filling has been completed, electrolyte sometimes dribbles down onto the site where the lid 22, near the fill port 40, and the filler plug 41 are to be welded together. However, because electrolyte-repelling treatment has been carried out at this site which is to be welded, the electrolyte is driven away from the site to be welded. Hence, electrolyte does not easily remain at regions where the outside surface of the lid 22 is to be welded. Thus, basically eliminating the need to carry out the removal of electrolyte remaining near the fill port 40. Even if electrolyte were to remain, because the electrolyte is on a surface that has been subjected to electrolyte-repelling treatment, removal is easy. As a result, during manufacture, the removal of electrolyte remaining near the fill port may be reliably carried out.

In addition, by using a lid 22 having regions 44a, 44b that have been subjected to electrolyte affinity-imparting treatment (FIGS. 3 and 4), electrolyte, that has been driven away from the site in the vicinity of the electrolyte fill port 40 where the lid 22 and the filler plug 41 are to be welded, can be at least temporarily trapped (held) in these regions. As a result, during manufacture, the removal of electrolyte remaining near the electrolyte fill port 40 may be reliably carried out.

Next, the step of closing the fill port 40 by welding together the lid 22 and the filler plug 41 is carried out. For example, welding may be typically carried out by laser welding.

By carrying out the above steps, the lithium ion secondary battery (cell assembly) 100 of this embodiment may be manufactured. Next, as in conventional lithium ion secondary batteries, the cell assembly is initially charged by connecting an external power supply between the positive electrode terminal and the negative electrode terminal, and charging the cell assembly at a normal temperature (typically about 25° C.) until the voltage across the positive and negative electrode terminals reaches a given value. For example, initial charging may be carried out by constant-current constant-voltage charging (CC-CV charging) that entails charging at a constant current of about 0.1 C to 10 C from the start of charging until the voltage across the terminals reaches a given value, then charging at a constant voltage until the state-of-charge (SOC) becomes about 60% to 100%. By subsequently carrying out aging treatment, an operational lithium ion secondary battery 100 can be obtained. Aging treatment is carried out by holding an initially charged battery at a temperature of, for example, 35° C. or more for 6 hours or more (preferably 30 hours or more, and more preferably 40 hours or more). In this way, the internal resistance following treatment can be held lower than before treatment.

Although the lithium ion secondary battery 100 according to this embodiment can be manufactured in the foregoing way, this serves merely as an example and does not characterize or limit the embodiments disclosed.

Several embodiments have been described in detail above, although it should be noted that these embodiments are provided only by way of illustration and do not in any way limit the scope of the claims. Many variations and modifications to these embodiments are encompassed by the art recited in the claims.

What is claimed is:

1. A sealed battery comprising:
a case provided with a case body having an opening therein and a lid that is sized so as to be capable of closing the opening and that has an electrolyte fill port;
an electrode assembly that is housed in the case; and
an electrolyte solution,
wherein the lid is provided with a filler plug that is welded to the lid so as to close the fill port, and an outside surface of the lid has a surface treated region forming an electrolyte-repelling region surrounding the weld where the filler plug is welded and another surface treated region forming an electrolyte-affinity region near the electrolyte-repelling region, and
wherein,
upon the electrolyte solution contacting the electrolyte-repelling region of the outside surface of the lid, the electrolyte-repelling region imparts a contact angle of 100° or more between a surface of the electrolyte-repelling region and the electrolyte solution, and
upon the electrolyte solution contacting the electrolyte-affinity region of the outside surface of the lid, the electrolyte-affinity region imparts a contact angle of 80° or less between a surface of the electrolyte-affinity region and the electrolyte solution, and
the electrolyte repellency of the electrolyte-repelling region is higher than the electrolyte-affinity region, and the electrolyte affinity of the electrolyte-affinity region is higher than the electrolyte-repelling region.

2. The sealed battery according to claim 1, wherein the fill port in the lid has, on a peripheral wall thereof, a retainer for setting thereon the filler plug, and wherein a surface on which the filler plug is set in the retainer has the electrolyte repellency to repel the electrolyte solution.

3. The sealed battery according to claim 1, wherein the fill port in the lid has, on a peripheral wall thereof, a step which has a surface facing the filler plug and having the electrolyte affinity to retain the electrolyte solution at least temporarily.

4. A method of manufacturing a sealed battery that includes a case provided with a case body having an opening therein and a lid that is sized so as to be capable of closing the opening and that has an electrolyte fill port, an electrode assembly that is housed in the case, and an electrolyte solution,
the method comprising:
using the electrode assembly, the case body and the lid to assemble a cell assembly, in which the electrode assembly is housed at an interior of the case with the lid, wherein an outside surface of the lid has a surface treated region forming an electrolyte-repelling region peripheral to the fill port and another surface treated region forming an electrolyte-affinity region near the electrolyte-repelling region, and
wherein
the electrolyte repellency of the electrolyte-repelling region is higher than the electrolyte affinity region and the electrolyte affinity of the electrolyte affinity region is higher than the electrolyte-repelling region;
filling an electrolyte solution through the fill port into the case;
wherein,
when the electrolyte solution contacts the electrolyte-repelling region of the outside surface of the lid, the electrolyte-repelling region imparts a contact angle of 100° or more between a surface of the electrolyte-repelling region and the electrolyte solution, and
when the electrolyte solution contacts the electrolyte-affinity region of the outside surface of the lid, the electrolyte-affinity region imparts a contact angle of 80° or less between a surface of the electrolyte-affinity region and the electrolyte solution, and
closing the fill port by welding together the lid and the filler plug.

5. The manufacturing method according to claim 4, wherein the fill port in the lid that is used has, on a peripheral wall thereof, a retainer for setting thereon the filler plug, and wherein a surface on which the filler plug is set in the retainer has the electrolyte repellency to repel the electrolyte solution.

6. The manufacturing method according to claim 4, wherein the fill port in the lid that is used has, on a peripheral wall thereof, a step in which a surface facing the filler plug has the electrolyte affinity to retain the electrolyte solution at least temporarily.

7. A lid of a sealed battery assembly, comprising:
a fill port disposed on the lid,
a filler plug welded to the lid to close the fill port,
a welded area in which the lid is welded to the filler plug,
wherein an outside surface of the lid has a surface treated region forming an electrolyte-repelling region surrounding the welded area and another surface treated region forming an electrolyte-affinity region near the electrolyte-repelling region, and wherein
when the electrolyte solution contacts the electrolyte-repelling region of the outside surface of the lid, the electrolyte-repelling region imparts a contact angle of 100° or more between a surface of the electrolyte-repelling region and the electrolyte solution, and
when the electrolyte solution contacts the electrolyte-affinity region of the outside surface of the lid, the electrolyte-affinity region imparts a contact angle of 80° or less between a surface of the electrolyte-affinity region and the electrolyte solution, and
the electrolyte repellency of the electrolyte-repelling region is higher than the electrolyte affinity region, and the electrolyte affinity of the electrolyte affinity region is higher than the electrolyte-repelling region.

8. The lid of a sealed battery assembly according to claim 7, wherein the fill port includes a first step on which the filler plug is set, and wherein a surface on which the filler plug is set has the electrolyte repellency to repel the electrolyte solution.

9. The lid of a sealed battery assembly according to claim 8, wherein the fill port includes a second step which is located farther away from the filler plug than the first step, and wherein the second step has a surface facing the filler plug and having the electrolyte affinity to retain the electrolyte solution at least temporarily.

* * * * *